(12) United States Patent  
Berkcan et al.

(10) Patent No.: US 8,966,970 B2
(45) Date of Patent: Mar. 3, 2015

(54) FLOW SENSOR ASSEMBLY HAVING A HYBRID SENSOR RESPONSE

(71) Applicant: General Electric Company, Schenectady, NY (US)

(72) Inventors: Ertugrul Berkcan, Clifton Park, NY (US); Bo Li, Rexford, NY (US); Nannan Chen, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 279 days.

(21) Appl. No.: 13/717,880

(22) Filed: Dec. 18, 2012

(65) Prior Publication Data

US 2014/0165718 A1   Jun. 19, 2014

(51) Int. Cl.
 *G01F 1/68* (2006.01)
 *G01F 1/684* (2006.01)
 *G01F 1/32* (2006.01)

(52) U.S. Cl.
 CPC ............ *G01F 1/6842* (2013.01); *G01F 1/32* (2013.01); *G01F 1/68* (2013.01)
 USPC ...................................................... 73/204.21

(58) Field of Classification Search
 USPC .............................. 73/204.21, 202.5, 861.24
 See application file for complete search history.

(56) References Cited

U.S. PATENT DOCUMENTS

| | | | |
|---|---|---|---|
| 3,722,273 A | 3/1973 | Yamasaki et al. | |
| 4,083,244 A | 4/1978 | Agar et al. | |
| 4,445,388 A * | 5/1984 | Herzl et al. | 73/861.24 |
| 4,453,416 A * | 6/1984 | Knudsen | 73/861.24 |
| 4,565,098 A | 1/1986 | Herzl | |
| 4,938,053 A | 7/1990 | Jepson et al. | |
| 5,003,810 A | 4/1991 | Jepson et al. | |
| 5,020,373 A | 6/1991 | Kamiunten et al. | |
| 6,655,207 B1 * | 12/2003 | Speldrich et al. | 73/202.5 |
| 6,715,339 B2 | 4/2004 | Bonne et al. | |
| 6,895,813 B2 | 5/2005 | Mattar | |
| 6,912,918 B1 | 7/2005 | Lynnworth et al. | |
| 6,938,473 B2 * | 9/2005 | Iwaki et al. | 73/204.21 |
| 6,971,272 B2 | 12/2005 | Forster et al. | |
| 7,654,157 B2 | 2/2010 | Speldrich | |
| 7,874,208 B2 * | 1/2011 | Redemann et al. | 73/202 |
| 7,895,904 B2 * | 3/2011 | Matsubara et al. | 73/861.22 |
| 7,926,343 B2 | 4/2011 | Ariyoshi et al. | |
| 8,104,340 B2 * | 1/2012 | Speldrich | 73/202.5 |

(Continued)

OTHER PUBLICATIONS

PCT Search Report and Written Opinion dated Feb. 27, 2014 from corresponding Application No. PCT/US2013/075459.

(Continued)

*Primary Examiner* — Jewel V Thompson
(74) *Attorney, Agent, or Firm* — Jason K. Klindtworth

(57) ABSTRACT

A flow sensor system including a flow sensor assembly is provided. The sensor assembly may be configured to allow fluid flow through a flow conduit. A flow disrupter may be disposed in the flow conduit to impart disturbances to the fluid flow. A by-pass channel may be in fluid connection with the flow conduit and may be arranged to have a geometrical relationship relative to the flow conduit and the flow disrupter to affect flow characteristics in the bypass channel. One or more sensors may be disposed in the by-pass channel to generate a signal responsive to the flow characteristics in the bypass channel. In a first flow regime, the flow characteristics in the bypass channel may effect an amplitude response of the sensor, and in a second flow regime, the flow characteristics may effect a temporal response of the sensor.

31 Claims, 4 Drawing Sheets

(56) References Cited

U.S. PATENT DOCUMENTS

| | | | |
|---|---|---|---|
| 8,286,506 B2 | 10/2012 | Speldrich | |
| 8,826,731 B2* | 9/2014 | Speldrich et al. | 73/204.21 |
| 2003/0167836 A1 | 9/2003 | Mattar | |
| 2008/0016957 A1 | 1/2008 | Suzuki | |
| 2008/0196493 A1 | 8/2008 | Anzai et al. | |
| 2010/0018323 A1* | 1/2010 | Cheng et al. | 73/861.24 |
| 2010/0191481 A1* | 7/2010 | Steven | 702/47 |

OTHER PUBLICATIONS

Burkert, "Bypass Mass Flow Meter (MFM) For Gases", Burkert Fluid Control Systems, DTS 1000019862, pp. 1-4, Aug. 14, 2008.

Rauscher et al., "Fundamentals of Spectrum Analysis", Rohde & Schwarz GmbH & Co. KG, 2001, pp. 1-221.

* cited by examiner

FLOW SENSOR ASSEMBLY HAVING A HYBRID SENSOR RESPONSE

FIELD OF THE INVENTION

The present in invention is related to flow sensing, and, more particularly, to a sensing system, as may involve a sensor assembly and a processor for sensing and measuring a fluid flow, such as may be used in flow metering, flow control and other applications.

BACKGROUND OF THE INVENTION

Various types of flow sensing devices are known in the art, such as mass flow sensing devices, as may provide a mass flow rate measurement (e.g., kilogram/second). Other flow sensing devices may involve vortex-based sensing where, for example, the frequency at which the vortices are formed (shed) is essentially proportional to the flow rate of the fluid.

Mass flow sensing devices generally do not provide a direct volumetric flow measurement, and consequently such sensing devices may be adversely impacted by various real-world considerations, such as gas density fluctuations, moisture fluctuations, gas mixture fluctuations, etc. In the case of vortex-based sensing devices, although such devices may provide a direct volumetric flow measurement, when the fluid velocity is too low, (e.g., inadequate (or practically no) formation of vortices) this may prevent such devices from operating correctly.

Accordingly, it is desirable to provide a cost-effective flow sensor system that may provide accurate and reliable volumetric flow measurements across its entire dynamic range of operation while being substantially impervious to fluctuations such as noted above.

SUMMARY OF THE INVENTION

Generally, aspects of the present invention in one example embodiment may provide a flow sensor assembly including a flow conduit configured to allow fluid flow through the flow conduit. A flow disrupter may be disposed in the flow conduit to impart disturbances to the fluid flow. A by-pass channel may be in fluid connection with the flow conduit and may be arranged to have a geometrical relationship relative to the flow conduit and the flow disrupter to affect at least some flow characteristics in the bypass channel. At least a first sensor may be disposed in the by-pass channel and may be arranged to generate a signal responsive to the flow characteristics in the bypass channel. A processor may be coupled to the first sensor to receive the generated signal and determine a flow rate for the fluid flow through the flow conduit. In a first flow regime, the flow rate may be determined based on an amplitude response of the sensor to the flow characteristics in the bypass channel, and in a second flow regime, the flow rate may be determined based on a temporal response of the sensor to the flow characteristics in the bypass channel.

Further aspects of the present invention in another example embodiment may provide a flow sensor assembly including a flow conduit configured to allow fluid flow through the flow conduit. A flow disrupter may be disposed in the flow conduit to impart disturbances to the fluid flow. A by-pass channel may be in fluid connection with the flow conduit and may be arranged to have a geometrical relationship relative to the flow conduit and the flow disrupter to affect at least some flow characteristics in the bypass channel. At least a first sensor may be disposed in the by-pass channel and may be arranged to generate a signal responsive to the flow characteristics in the bypass channel. In a first flow regime, the flow characteristics in the bypass channel may effect an amplitude response of the sensor, and in a second flow regime, the flow characteristics may effect a temporal response of the sensor.

BRIEF DESCRIPTION OF THE DRAWINGS

The invention is explained in the following description in view of the drawings that show.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
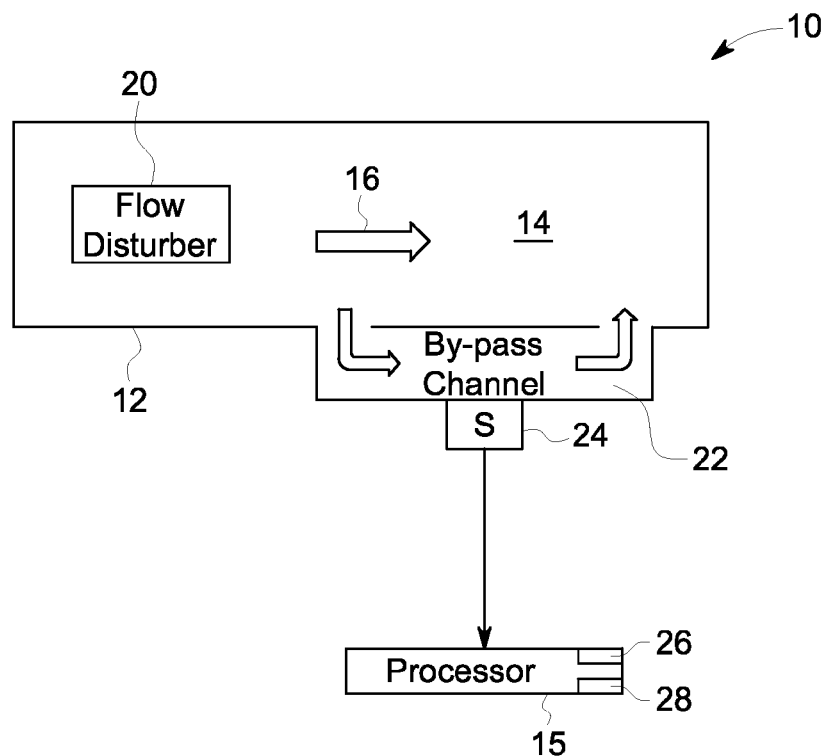
FIG. 1 is a schematic of one example embodiment of a flow sensor system embodying aspects of the present invention.

FIG. 1 is a schematic of one example embodiment of a flow sensor system embodying aspects of the present invention. The flow sensor system, as may be used to measure a flow of fluid (e.g., gas or liquid), may include a sensor assembly 12 and a processor 15. Sensor assembly 12 includes a flow conduit 14 configured to allow fluid flow (e.g., schematically represented by arrow 16) to pass through conduit 14. A flow disrupter 20 is disposed in flow conduit 14 to impart disturbances (e.g., vortices, pressure fluctuations) to the fluid flow. A by-pass channel 22 is in fluid connection with flow conduit 14 and may be arranged to have a geometrical relationship relative to flow conduit 14 and flow disrupter 20 to affect at least some flow characteristics in the bypass channel.

At least a first sensor 24 (block labeled with letter S) may be disposed in by-pass channel 22 and may be arranged to generate a signal (e.g., an electrical signal, such as a voltage) responsive to the flow characteristics in the bypass channel. Processor 15 is coupled to sensor 24 to receive the signal from sensor 24 to determine a flow rate for the fluid flow through flow conduit 14.

In one example case, the flow rate may be determined based on an amplitude response (e.g., voltage amplitude (VAmp)) of sensor 24 to the flow characteristics in the bypass channel. For example, a first flow regime may comprise substantially laminar fluid flow through by-pass channel 22. In another example case, the flow rate may be determined based on a temporal response (Vf) of sensor 24 to the flow characteristics in bypass channel 22. One skilled in the art will recognize that this is conceptually equivalent to a frequency response of sensor 24 to the flow characteristics in bypass channel 22 since frequency=1/t (inverse of time (t)).

Generally, the first flow regime may be fluid flow at a flow rate value which is less than the flow rate value in a second flow regime. For example, the second flow regime may comprise a flow rate sufficiently high so that flow disrupter 20 imparts the disturbances (e.g., vortices, pressure fluctuations) to the fluid flow through flow conduit 14 and/or bypass channel 22. For example, the frequency of the vortices is essentially proportional to the flow rate of the fluid.

It will be appreciated by those skilled in the art that substantially laminar fluid flow through by-pass channel 22 is not necessarily determinative of the sensor response. For instance, there may be example cases where, for example, due to relatively small dimensions of the by-pass channel, the flow through the by-pass channel may be substantially laminar in both flow regimes. For example, the disturbances in this case may cause oscillatory pressure fluctuations such as at the entrance/exit of the by-pass channel, as may cause a measurable frequency modulation to the flow through the by-pass channel. Thus, in one example embodiment, the first flow regime may comprise fluid flow having a substantially steady pressure at an entrance (or exit) of the by-pass channel (or steady flow in the by-pass channel), and the second flow regime may comprise fluid flow having oscillatory pressure fluctuations at the entrance (or exit) of the by-pass channel.

It will be appreciated by those skilled in the art that a vortex-based flow measurement (e.g., such as may be performed in the second flow regime) is a direct volumetric flow measurement (e.g., liter/second). By comparison, a mass flow rate measurement (e.g., kilogram/second, such as may be performed in the first flow regime) would not result in a direct volumetric flow measurement since in the case of mass flow rate measurement, the volumetric measurement may only be derived with a knowledge of the density of the fluid. However, in the case of a gas, the density of the gas may vary substantially depending on various factors, such as pressure, temperature, gas composition, humidity, etc., which may introduce substantial measurement complexity and/or uncertainty, if one senses in a mass flow measurement modality and one desires a volumetric flow measurement.

Figure 2:
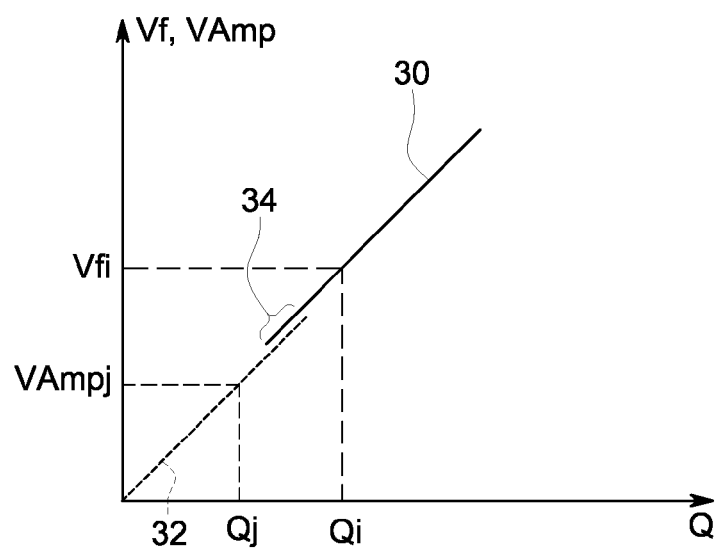
FIG. 2 is a plot for conceptualizing example sensor responses to the flow characteristics in the bypass channel, as such responses may develop under different flow regimes.

FIG. 2 is a plot which may facilitate conceptualizing aspects of example sensor responses (along ordinate axis) as a function of flow rate (Q, along the abscissa axis) to the flow characteristics in the bypass channel, as such sensor responses may develop under the foregoing flow regimes. For example, the second flow regime may be conceptually represented by solid line 30 and the first flow regime may be conceptually represented by dashed line 32. Lines 30 and 32 are illustrated in FIG. 2 as straight lines for purposes of simplicity of illustration and should not be interpreted as an indication of a linear relationship between the flow rate (Q) and the sensor responses.

For a given flow rate under the second flow regime (e.g., representative flow rate Qi), the sensor would output an AC (alternating current) signal with a corresponding frequency value (e.g., Vfi). Conversely, for a given flow rate under the first flow regime (e.g., representative flow rate Qj), the sensor may output a DC (direct current) signal with a corresponding amplitude value (e.g., VAmpj). It is noted that this amplitude-based measurement (outside the realm of a vortex-based measurement) is analogous to a mass flow measurement and by itself would not result in a direct volumetric flow measurement. Bracket 34 represents a region where there may be an overlap of sensor responses, such as corresponding to the first regime and to the second flow regime. For example, in this region (although near the low-end of the second flow regime) there still may be occurrence of a measurable temporal response (Vf) of sensor 24 to the flow characteristics (e.g., vortices may still be sufficiently formed) in bypass channel 22 while being sufficiently proximate to the first flow regime to also concurrently obtain a measurable amplitude response (Vamp).

Figure 3:
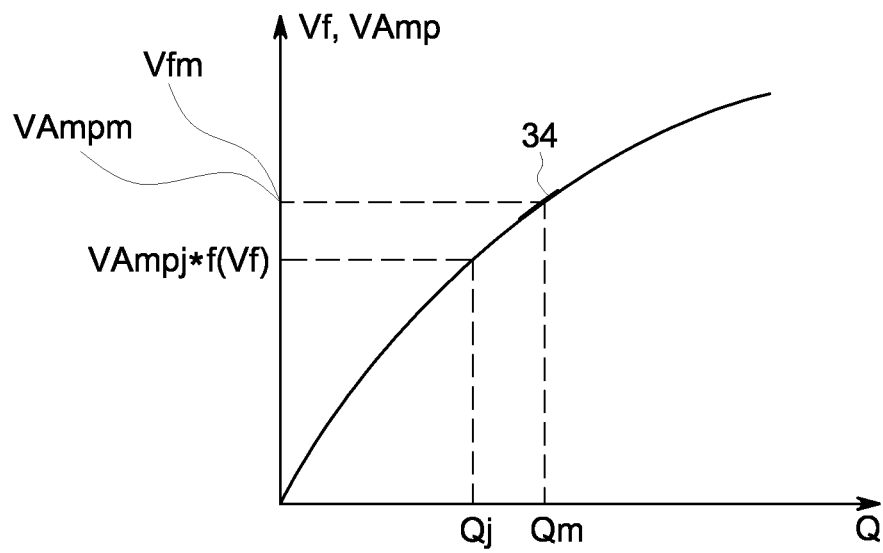
FIG. 3 is a plot for conceptualizing hybrid sensor responses which may develop in varying regions of flow regimes and which may be used to estimate a calibration function.

As will be described below and as illustrated in FIG. 3, region 34 (e.g., may conceptualized as having a hybrid sensor response; that is, involving both amplitude-based and vortex-based measurements) may be advantageously used to perform a calibration where for a given flow rate value, such as Qm, a corresponding amplitude response VAmpm of the sensor may be calibrated in view of the concurrent temporal response (Vfm) of the sensor. This calibration process may be iteratively performed for different flow rate values over region 34 to estimate a calibration function f(Vf), which may then be used to effectively transform the Vamp response values measured in the first flow regime (e.g., where vortices are no longer formed) into volumetric flow values. For example, the representative VAmpj measured value (FIG. 2) obtained from the amplitude response of the sensor may be transformed by way of the calibration function f(Vf) to a volumetric flow value (e.g., f(Vf)*VAmpj), as conceptually illustrated in FIG. 3.

It should be appreciated from the foregoing that the inventors of the present invention have innovatively discovered a flow sensor system, where across its entire dynamic range of operation, one is able to effectively provide accurate volumetric flow measurements, which are practically free of measurement complexity and/or measurement uncertainty, which otherwise could be introduced at the low-end of the dynamic range of the sensor (e.g., first flow regime), such as due to gas density variation, etc. For example, the calibration function obtained in region 34 allows transforming the amplitude response of the sensor in region 32 (e.g., mass flow sensing in the first flow regime) to a volumetric flow measurement (e.g., analogous to a vortex-based measurement as may be performed in the second flow regime).

Figure 4:
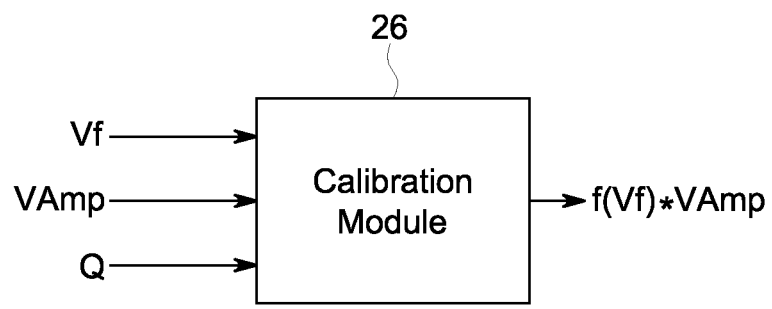
FIG. 4 is a block diagram of a calibration module which may be used to estimate the calibration function.

In one example embodiment, processor 15 may include a calibration module 26 (see also FIG. 4) configured to perform a calibration function in a flow regime, which includes an overlap of respective responses associated with the first and second flow regimes. As noted above, calibration module 26 receives respective measurements Q, Vamp, Vf obtained in the overlapping region to estimate calibration function f(Vf), which may then be applied to amplitude measurement values obtained in the first flow regime (e.g., f(Vf)*VAmpj) effectively transforming the amplitude response (Vamp) of the sensor to a vortex-based flow measurement and thus effecting a volumetric flow measurement across the entire dynamic range of the sensor system. For example, in the example case where the fluid comprises a gas or a gas mixture, the flow rate determined during the first and second flow regimes (e.g., across the full dynamic range of the sensor) would be a flow rate determination, which is substantially free from effects, such as gas density fluctuations, gas mixture fluctuations, moisture fluctuations, etc.

In one example embodiment processor 15 may include a signal processor module 28 (FIG. 1) as may be configured to perform a spectral analysis on the signal supplied by sensor 24, as may be used to rapidly and precisely monitor changes in the frequency response of sensor 24. As will be now appreciated by one skilled in the art, example signal processing techniques that may be used to perform such spectral analysis may include signal processing based on Fast Fourier Transform (FFT), signal processing based on the heterodyne principle, and signal processing based on utilization of a phase-locked loop. For readers desirous of general background information in connection with spectral analysis, reference is made to textbook titled "Fundamentals of Spectrum Analysis" by Christoph Rauscher, available from Rohde & Schwarz GmbH & Co. KG, Germany, which textbook is herein incorporated by reference.

In one example embodiment, the geometrical relationship between by-pass channel 22 and flow conduit 14 and flow disrupter 16 may be selected to cause a cross-correlation, such as a correlation between a flow pressure at an entrance of by-pass channel 22 and a flow pressure at an exit of the by-pass channel 22. For example, the cross-correlation may be selected to affect a phase difference between the flow pressure at the entrance of the by-pass channel and the flow pressure at the exit of the by-pass channel. This phase difference may be selected to increase a signal-to-noise ratio of the signal supplied by sensor 24. For example, the flow pressure at the entrance of by-pass channel 22 and the flow pressure at the exit of the by-pass channel 22 may be substantially out-of-phase relative to one another. This cross-correlation would provide an effective suppression of common mode noise effects in the signal supplied by sensor 24. Example parameters that may be involved in the geometrical relationship between by-pass channel 22 and flow conduit 14 and flow disrupter 16 may be the respective dimensions of by-pass channel 22, flow conduit 14 and flow disrupter 16 relative to one another; the positioning of flow disrupter 16 in flow conduit 14 relative to by-pass channel 22; and combinations of the foregoing.

In one example embodiment sensor 24 may be a mass flow sensor. It will be appreciated by one skilled in the art that any of various sensor modalities may be utilized to implement sensor 24, such as a thermo-electric sensor, a microelectromechanical (MEMS) sensor, a thermopile, a temperature sensor, a calorimetric flow sensor, a hot wire anemometer.

Figure 5:
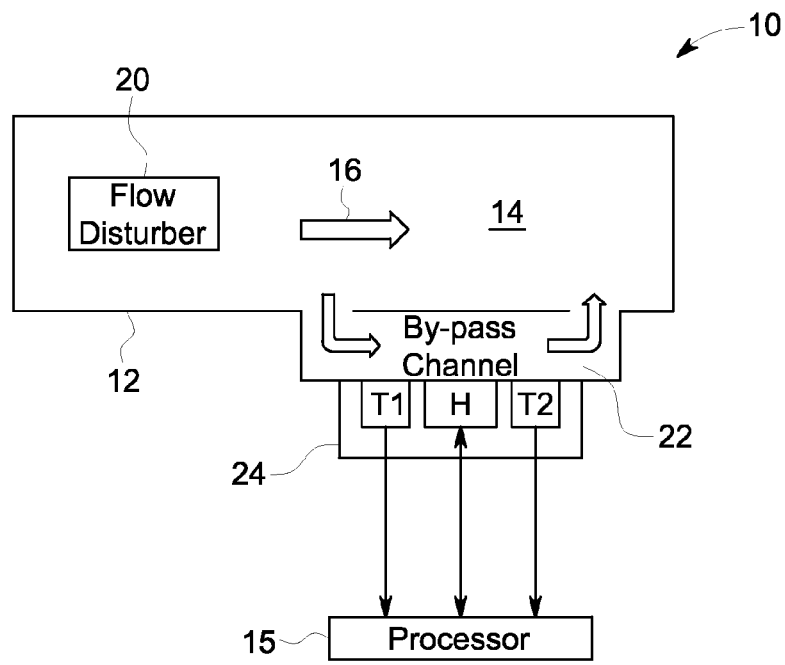
FIGS. 5-7 illustrate respective schematics of various example embodiments of a sensor assembly embodying aspects of the present invention.

As illustrated in FIG. 5, in one example embodiment sensor 24 may be made up of a plurality of temperature sensors (e.g., blocks labeled T1 and T2 and a heater (e.g., block labeled H). In one example embodiment, heater H may be operated in a mode such as a constant current mode, a constant power mode or a constant temperature mode.

Figure 6:
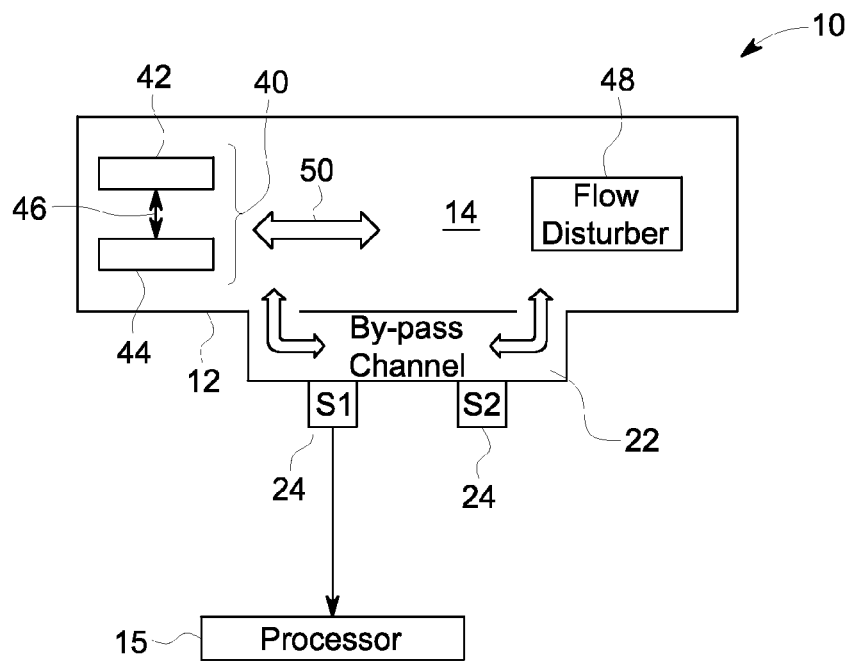

It will be appreciated that aspects of the present invention are not limited to any specific shape of the flow disrupter. For example, the flow disrupter may be configured as a blunt flow disrupter, a planar flow disrupter, a rectangular flow disrupter, or combinations thereof. As illustrated in FIG. 6, in the example case of a blunt flow disrupter 40, such a disrupter may be made up of a first part 42 separated from a second part 44 by a gap 46 (e.g., effectively functioning as a flow separator). As further illustrated in FIG. 6, it will be appreciated that sensor assembly 12 may include a second flow disturber 48 and may further include first and second sensors 24 (blocks respectively labeled S1 and S2). It will be further appreciated that fluid flow may be bi-directional (e.g., schematically represented by twin-headed arrow 50) and thus processor 15 may be further configured to indicate the direction of fluid flow together with the value of the flow rate.

Figure 7:
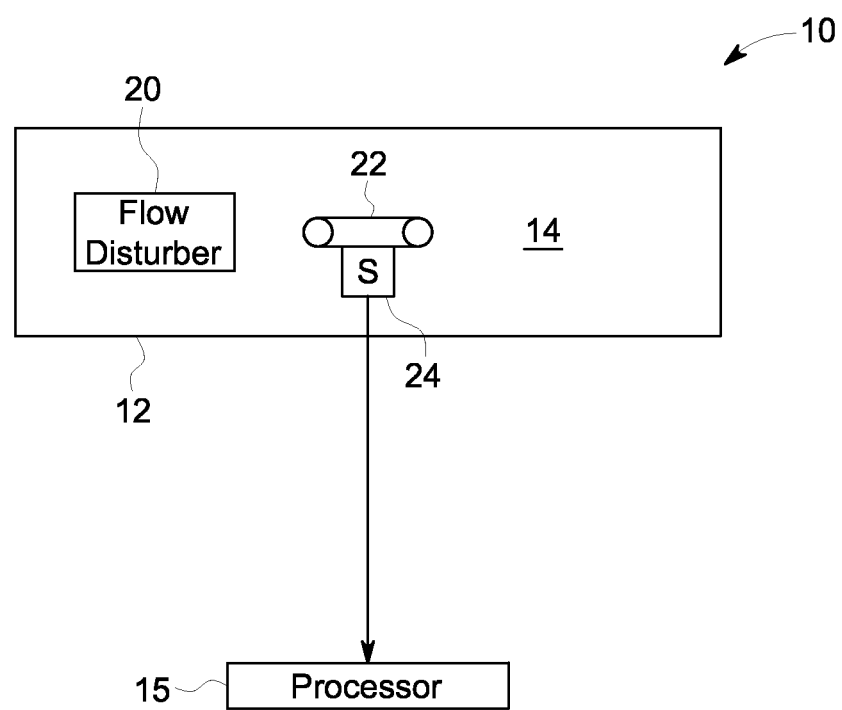

As illustrated in FIG. 7, by-pass channel 22 need not be structurally-formed outside flow conduit 14. In one example embodiment, by-pass channel 22 may be arranged to be within flow conduit 14, such as a relatively smaller pipe nested within a larger pipe.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A flow sensor system, comprising:
    a flow sensor assembly comprising:
        a flow conduit configured to allow fluid flow through the flow conduit;
        a flow disrupter disposed in said flow conduit to impart disturbances to the fluid flow;
        a by-pass channel in fluid connection with the flow conduit and arranged to have a geometrical relationship relative to the flow conduit and the flow disrupter to affect at least some flow characteristics in the bypass channel;
        at least a first sensor disposed in the by-pass channel and arranged to generate a signal responsive to the flow characteristics in the bypass channel; and
    a processor coupled to the first sensor to receive the generated signal and determine a flow rate for the fluid flow through the flow conduit, wherein in a first flow regime, the flow rate is determined based on an amplitude response of the sensor to the flow characteristics in the bypass channel, and wherein in a second flow regime, the flow rate is determined based on a temporal response of the sensor to the flow characteristics in the bypass channel.

2. The sensor system of claim 1, wherein the first flow regime comprises a substantially laminar fluid flow through the by-pass channel.

3. The sensor system of claim 2, wherein the second flow regime comprises fluid flow at a flow rate sufficiently high so that the flow disrupter imparts the disturbances to the fluid flow through the flow conduit.

4. The sensor system of claim 1, wherein the first flow regime comprises fluid flow having a substantially steady pressure at least at an entrance of the by-pass channel, and the second flow regime comprises fluid flow having oscillatory pressure fluctuations at the entrance of the by-pass channel.

5. The sensor system of claim 3, wherein the processor comprises a calibration module configured to estimate a calibration function in a flow regime comprising an overlap of the amplitude response and the temporal response of the sensor.

6. The sensor system of claim 5, wherein the calibration function is adapted to transform amplitude values obtained in the first flow regime to a volumetric flow measurement.

7. The sensor system of claim 1, wherein in the first flow regime, a calibration function is applied to the amplitude response of the sensor to transform the amplitude response of the sensor to a volumetric flow measurement for the fluid flow through the flow conduit.

8. The sensor system of claim 1, wherein the geometrical relationship is selected to effect a cross-correlation between a flow pressure at an entrance of the by-pass channel and a flow pressure at an exit of the by-pass channel.

9. The sensor system of claim 8, wherein the cross-correlation effects a suppression of common mode noise effects in the signal supplied by the first sensor.

10. The sensor system of claim 1, wherein the geometrical relationship is selected to affect a phase difference between a flow pressure at an entrance of the by-pass channel and a flow pressure at an exit of the by-pass channel.

11. The sensor system of claim 10, wherein the phase difference is selected to increase a signal-to-noise ratio of the signal supplied by the first sensor.

12. The sensor system of claim 1, wherein the fluid comprises a gas or a gas mixture and wherein the flow rate determined during the first and second flow regimes comprises a flow rate determination substantially free from effects selected from the group consisting of gas density fluctuations, gas mixture fluctuations and moisture fluctuations.

13. The sensor system of claim 1, wherein said at least first sensor comprises a mass flow sensor.

14. The sensor system of claim 13, wherein the mass flow sensor comprises a sensor selected from the group consisting of a thermo-electric sensor, a microelectromechanical (MEMS) sensor, a thermopile, a temperature sensor, a calorimetric flow sensor, and a hot wire anemometer.

15. The sensor system of claim 1, wherein said at least first sensor comprises at plurality of temperature sensors and at least one heater.

16. The sensor system of claim 15, wherein the heater is operated in a mode selected from the group consisting of a constant current mode, a constant power mode and a constant temperature mode.

17. The sensor system of claim 1, further comprising a second sensor disposed within the by-pass channel at a location spaced-apart from the first sensor.

18. The sensor system of claim 1, wherein the flow disrupter comprises a flow disrupter selected from the group consisting of a blunt flow disrupter, a rectangular flow disrupter, or combinations thereof.

19. The sensor system of claim 1, wherein the flow disrupter comprises a blunt flow disrupter comprising a first part separated from a second part by a flow separator.

20. The sensor system of claim 1, further comprising a second flow disrupter.

21. The sensor system of claim 2, wherein the second flow regime comprises fluid flow at a flow rate sufficiently high so that the flow disrupter imparts the disturbances to the fluid flow through at least one of the flow conduit and the by-pass channel.

22. The sensor system of claim 1, wherein the first flow regime comprises a flow rate value which is less than a flow rate value in the second flow regime.

23. The sensor system of claim 1, wherein the processor comprises a signal processor module configured to perform a spectral analysis on the signal received from the sensor.

24. The sensor system of claim 23, wherein the signal processor module performs the spectral analysis based on a signal processing selected from the group consisting of a Fast Fourier Transform, a signal processing based on a heterodyne principle, and a signal processing utilizing a phase-locked loop.

25. A flow sensor assembly comprising:
a flow conduit configured to allow fluid flow through the flow conduit;
a flow disrupter disposed in said flow conduit to impart disturbances to the fluid flow;
a by-pass channel in fluid connection with the flow conduit and arranged to have a geometrical relationship relative to the flow conduit and the flow disrupter to affect at least some flow characteristics in the bypass channel;
at least a first sensor disposed in the by-pass channel and arranged to generate a signal responsive to the flow characteristics in the bypass channel, wherein in a first flow regime, the flow characteristics in the bypass channel effect an amplitude response of the sensor, and wherein in a second flow regime, the flow characteristics effect a temporal response of the sensor.

26. The sensor assembly of claim 25, further comprising a processor coupled to the first sensor to receive the generated signal and determine a flow rate for the fluid flow through the flow conduit.

27. The sensor assembly of claim 25, wherein the first flow regime comprises a substantially laminar fluid flow through the by-pass channel.

28. The sensor system of claim 1, wherein the first flow regime comprises fluid flow having a substantially steady pressure at least at an entrance of the by-pass channel, and the second flow regime comprises fluid flow having oscillatory pressure fluctuations at the entrance of the by-pass channel.

29. The sensor assembly of claim 27, wherein the second flow regime comprises fluid flow at a flow rate sufficiently high so that the flow disrupter imparts the disturbances to the fluid flow through the flow conduit.

30. The sensor assembly of claim 26, wherein the processor comprises a calibration module configured to estimate a calibration function in a flow regime comprising an overlap of the amplitude response and the temporal response of the sensor.

31. The sensor assembly of claim 30, wherein the calibration function is adapted to transform amplitude values obtained in the first flow regime to a volumetric flow measurement of a gas or gas mixture, wherein the volumetric flow measurement is substantially free from effects selected from the group consisting of gas density fluctuations, gas mixture fluctuations and moisture fluctuations.

* * * * *